United States Patent
Tatsumi (10) Patent No.: US 6,788,778 B2
(45) Date of Patent: Sep. 7, 2004

(54) PRIVATE BRANCH EXCHANGE (PBX) SYSTEM, PRIVATE BRANCH EXCHANGE, AND METHOD OF COMMUNICATION USING THE SAME PBX SYSTEM

(75) Inventor: Yukichi Tatsumi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 269 days.

(21) Appl. No.: 09/988,599

(22) Filed: Nov. 20, 2001

(65) Prior Publication Data

US 2002/0064275 A1 May 30, 2002

(30) Foreign Application Priority Data

Nov. 22, 2000 (JP) ........................................ 2000-355407

(51) Int. Cl.⁷ .............................................. H04M 7/00
(52) U.S. Cl. .................................. 379/234; 379/142.06
(58) Field of Search ........................... 379/142.06, 231, 379/232, 233, 234

(56) References Cited

U.S. PATENT DOCUMENTS 5,268,958 A * 12/1993 Nakano ...................... 379/246
5,546,447 A * 8/1996 Skarbo et al. ......... 379/142.05
6,546,083 B1 * 4/2003 Chaves et al. ........... 379/88.03

OTHER PUBLICATIONS

Telecommunications 1999, "Telephones, Facsimile Systems, System Communications", pp. 32–44.

* cited by examiner

Primary Examiner—Ahmad F. Matar
Assistant Examiner—Quynh H. Nguyen
(74) Attorney, Agent, or Firm—McDermott, Will & Emery (57) ABSTRACT

A private branch exchange (PBX) system includes plural extension telephones divided into extension groups, and a PBX which sends information about one of the extension group to a caller. Plural extension interfaces (I/Fs) coupling the extension telephones to the PBX are divided into groups. The PBX calls each of the extension telephones coupled to all the extension I/Fs of the extension groups corresponding to a call-in signal. In the PBX, a memory stores text data about the extension groups. A controller sends the text data about the extension group to a caller's telephone responsive to the call-in signal. The information can be thus displayed on an extension telephone or an outside-line telephone of the caller.

22 Claims, 10 Drawing Sheets

| Call-in group | Extension No. | Extension No. | Extension No. | Direct-dialing No. | Caller name | Company name |
|---|---|---|---|---|---|---|
| 1 | 1000 | 1001 | 1002 | 092-477-xxx1 | Sales dep. | Company ABC |
| 2 | 1099 | 1100 | 1101 | 092-477-xxx2 | Planning dep. | |
| 3 | 1020 | 1021 | 1023 | 092-477-xxx3 | Engineering dep. | |

FIG. 5

| Outside Line I/F No. | Call-in destination 1 | Call-in destination 2 | Call-in destination 3 | Call-in destination 4 |
|---|---|---|---|---|
| 1 | Call-in group 1 | | | |
| 2 | Call-in group 2 | | | |
| 3 | Extension 1050 | Extension 1051 | Extension 1052 | Extension 1053 |

FIG. 6

| Function button No. | Extension 1000 | Extension 1001 | Extension 1002 |
|---|---|---|---|
| 1 | Outside line I/F 1 | Group 1 | Extension 101 |
| 2 | Outside line I/F 2 | Group 1 | Extension 100 |
| 3 | Outside line I/F 3 | Group 1 | Outside line I/F 3 |
| 4 | Outside line I/F 4 | Outside line I/F 10 | Outside line I/F 4 |
| ---- | ---- | ---- | ---- |
| 11 | Group 1 | Outside line I/F 12 | Group 3 |
| 12 | Group 2 | Outside line I/F 11 | Group 3 |

PRIVATE BRANCH EXCHANGE (PBX) SYSTEM, PRIVATE BRANCH EXCHANGE, AND METHOD OF COMMUNICATION USING THE SAME PBX SYSTEM

FIELD OF THE INVENTION

The present invention relates to technique about outgoing calls and incoming calls through outside lines or extension lines within a PBX system.

BACKGROUND OF THE INVENTION

A method has been known that an incoming call through an outside line arrives at a plurality of extension telephones that form a group. For instance, at least one extension number is stored in an outside-line interface, and when a call comes in, the method allows the call to arrive at the saved extension number. In a telephone-exchange apparatus including direct-dialing trunks, the direct dialing numbers correspond to predetermined extension numbers. An arrived call-in is entered into the extension number corresponding to the direct-dialing number.

As such, an arrived call-in can be connected to predetermined plural extensions. From a view of a caller, who places a call to such a PBX system having extensions forming a group as discussed above, it is indefinite whether the number to be called is a pilot number of a company, a personal direct-dialing number, or a pilot number of several subscribers.

SUMMARY OF THE INVENTION

The present invention addresses the problem discussed above, and aims to provide a PBX system having an improved function of call-in arriving at a group. The PBX system of the present invention comprises a plurality of extension telephones and a PBX. The PBX includes extension-line interfaces coupled to the extension telephones. The plurality of extension-line interfaces are divided into groups, and the PBX calls an extension telephone included in one of the extension groups. The group including this extension telephone corresponds to the calling signal. Buttons indicating the groups can be set on the extension telephones. In the PBX, a memory stores the information about the extension groups. When a call is placed from one of the extension telephones by depressing an extension-group button, the PBX allows the extension information saved in the memory to be sent to a called extension or a called outside telephone responsive to an instruction from a controller.

The PBX system thus allows the information about the calling extension group to be displayed on a display section of the called extension telephone or the called outside telephone.

In the PBX of the present invention, a group-number memory stores extensions and group-numbers of the extension group—to which the extensions belong—correlated with each other. A group-number detector detects a group number corresponding to a calling signal. An arrival-request-signal generator sends an arrival-request signal to an extension telephone that has an extension corresponding to the detected group number. A memory stores text data about the extension-groups. Receiving the calling signal to an extension group, a controller controls the PBX, thereby sending the text data to the caller.

A method of communication using the PBX of the present invention comprises the steps of:

(a) assigning call-in groups to function buttons of the extension-telephones and sending an information signal occurred by depressing the assigned function button (a group button) of the telephone to the PBX when the assigned function button is depressed;

(b) recognizing the information signal as a calling signal from the call-in group if the information signal is related to the function buttons;

(c) detecting a calling telephone number keyed-in at an extension telephone;

(d) examining whether the calling telephone number is an outside number or an extension number; and (e) sending group information including the group number as caller's information to the destination outside number when the calling number is an outside number, and sending information including the group name to the destination extension number.

DETAILED DESCRIPTION OF EXEMPLARY EMBODIMENTS

Figure 1:
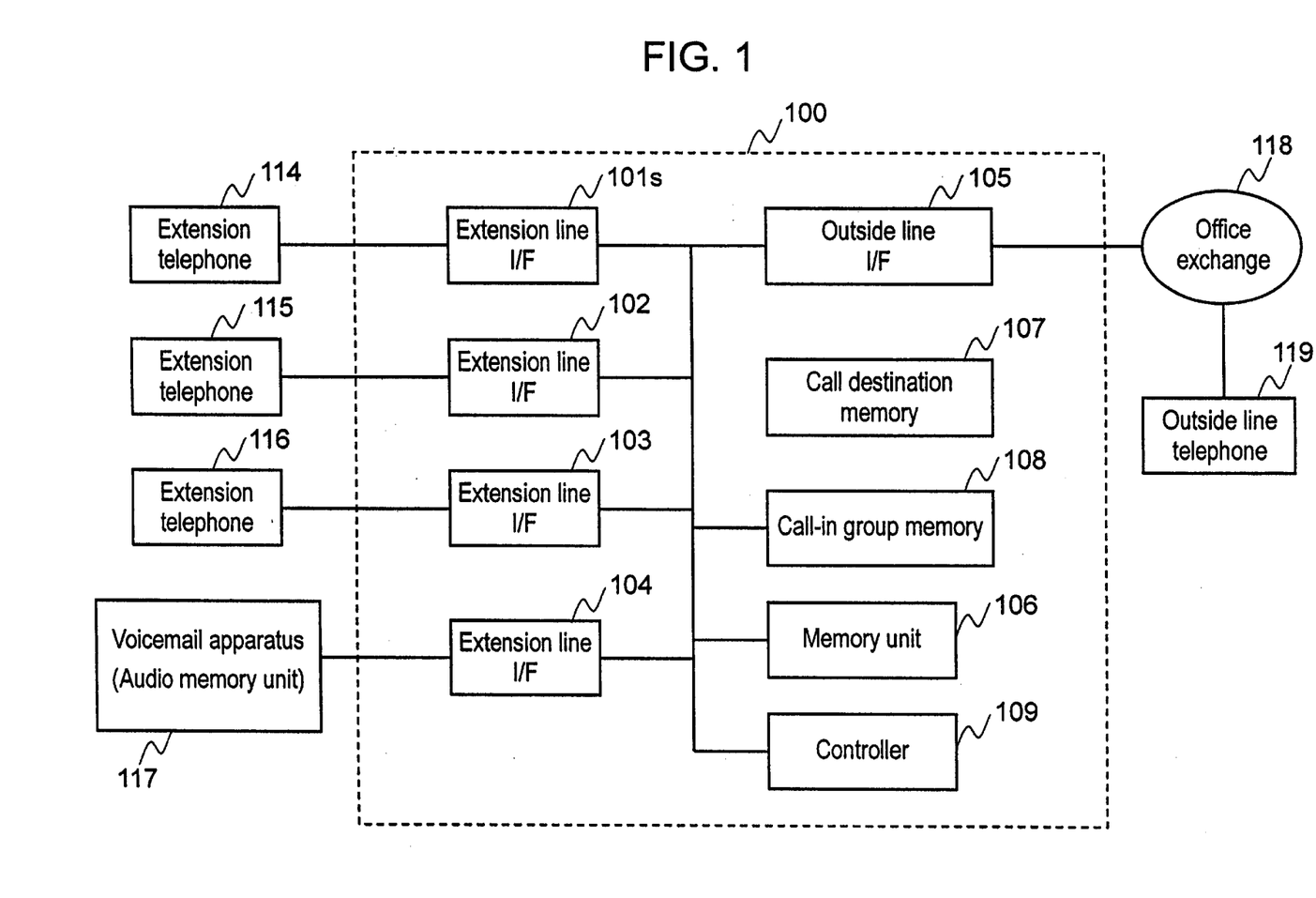
FIG. 1 shows a structure of a PBX system in accordance with an exemplary embodiment of the present invention.

An exemplary embodiment of the present invention is demonstrated hereinafter with reference to the accompanying drawings. FIG. 1 shows a structure of a PBX system in accordance with the exemplary embodiment of the present invention.

In FIG. 1, extension interfaces (I/Fs) 101–104 are connected to extension telephones being accommodated to digital PBX 100. The extension telephones include telephones dedicated to this PBX 100 and general telephones. Outside line I/F 105 is connected to an office exchange either in a digital system or an analog system. The digital office exchange can accommodate the trunks of ISDN, T1, E1 and the like. The analog office exchange can accommodate the trunks of loop-start, analog DID and the like. Digital PBX 100 includes a plurality of outside I/Fs 105.

Memory unit 106 stores programs necessary for controlling PBX 100. Call destination memory 107 stores information about call destinations of respective outside line I/Fs. Call-in group memory 108 stores "group numbers, group telephone numbers and group names" being correlated with each other of respective extension-groups. Call destination memory 107 stores the group numbers as call destinations. An extension group can be assigned to the plurality of outside line I/Fs. Controller 109 controls entire PBX 100.

Extension telephones 114–116 are respectively connected to extension I/Fs 101–104, and equipped with a display section such as an LCD. Extension telephones 114–116 have numbers of buttons with which various functions can be associated. In this embodiment, telephones dedicated to PBX 100 are used as the extension telephones. The proprietary telephones will be described later with reference to FIG. 3.

Voice mail apparatus 117 provides mail-box service or attendant service responsive to an incoming call through PBX 100. Using data-format of "2B+D" of ISDN, apparatus 117 sends or receives data or voice to/from PBX 100 via extension I/F 104. Office exchange 118 leads in an outside line telephone 119.

Figure 2:
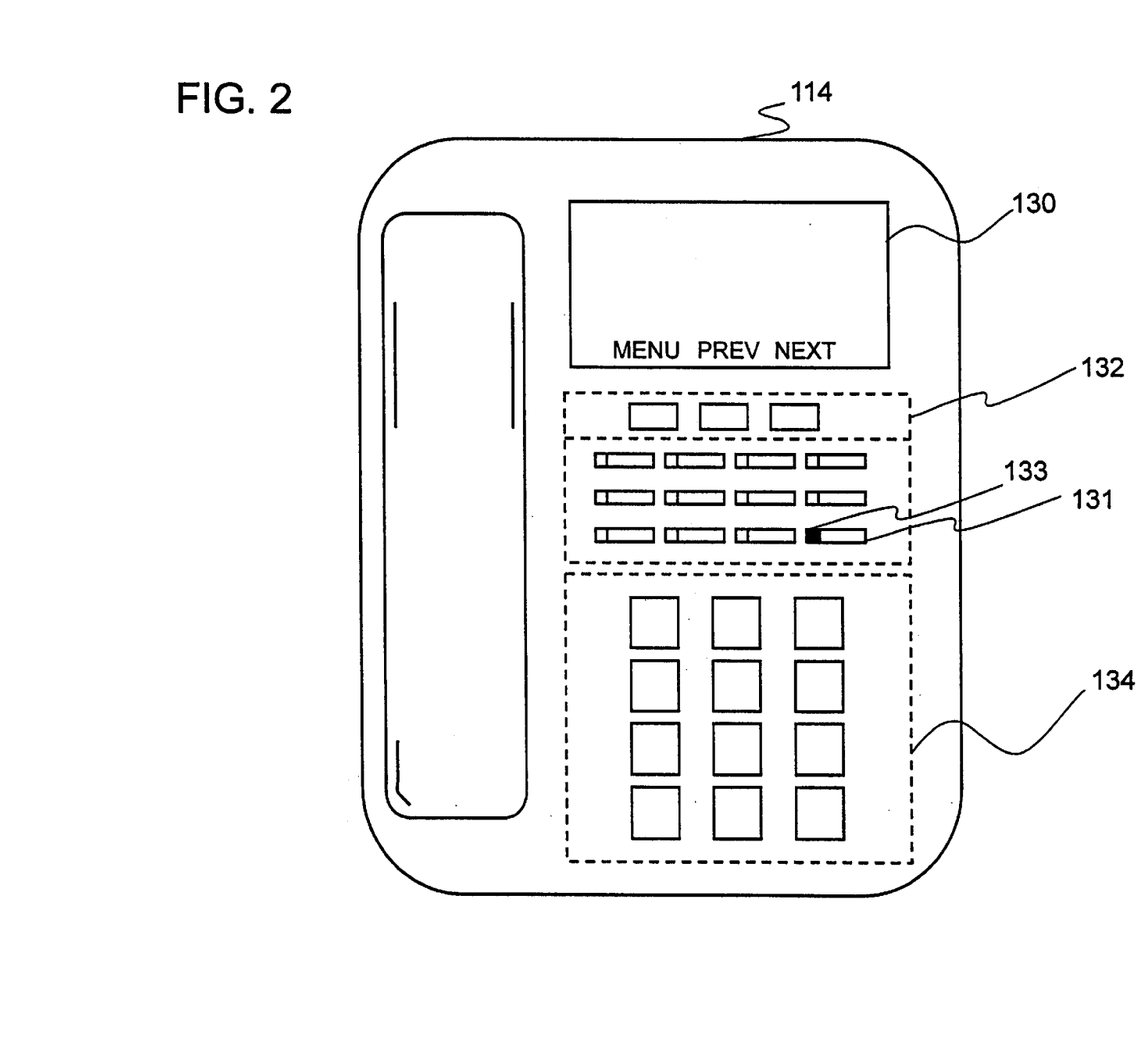
FIG. 2 shows an appearance constitution of a telephone dedicated to the PBX system in accordance with the exemplary embodiment of the present invention.
Figure 3:
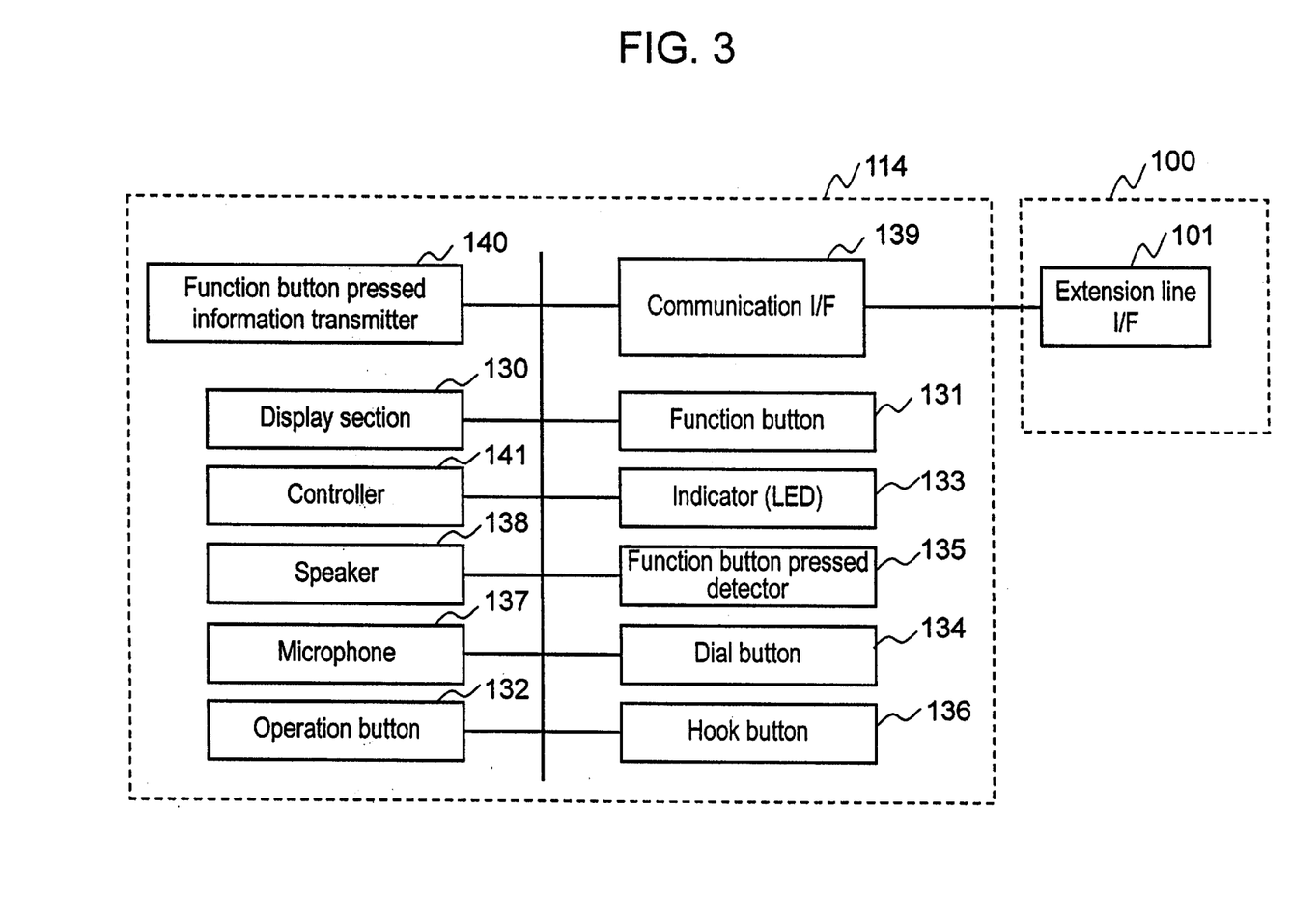
FIG. 3 shows a configuration of the proprietary telephone in accordance with the exemplary embodiment of the present invention.

FIG. 2 and FIG. 3 illustrate the structure of the telephone dedicated to the PBX system in accordance with this exemplary embodiment of the present invention. The proprietary telephone is generally called a key telephone, and allows a user to use the telephone with ease. This telephone includes buttons assigned to an outside line, extension line, forward, and the like in addition to regular functions available in a general telephone. These buttons allow the user to use those functions with ease. The proprietary phone also includes a display section for showing various data sent from the PBX.

In FIGS. 2 and 3, display section 130 such as an LCD displays various information. Function buttons 131 are equipped with various functions arbitrarily such as indicating busy or free of extensions and outside lines, being used for placing a call or receiving a call-in and the like. Dial buttons 134 are used for dialing a telephone number.

Referring to display section 130, a user assigns respective functions to each of buttons 131 using operation buttons 132 and dial button 134. Indicators 133 corresponding to respective function buttons 131—indicate their statuses, e.g., they are connected to the outside line or not. Indicator 133 is formed of an LED or a lamp, and it can include a driver of the LED or the lamp.

For instance, when a call comes in through an outside line, the LED indicator attached to a button assigned to an outside line flashes red, and while the telephone is engaged to the outside call, the LED indicator lights green. The LED indicator does not light while the telephone is in standby mode. Indicator 133 is referred to as LED 133 hereinafter because an LED is used in each of the indicators.

Function-button pressed detector 135 detects that function button 131 is depressed. Hook button 136 is turned on/off for starting a call and completing the call. Microphone (mike) 137 is used for transmitting a speech and speaker 138 is used for listening to a speech. When a handset is used for a call, the speaker and mike embedded in the handset are used. When a speakerphone is used, the speaker and mike built in the telephone body are used.

Communication I/F 139 sends/receives an audio signal and a control signal to/from extension I/Fs 101–104 of PBX 100 with the protocol of "2B+D". Function button pressed information transmitter 140 transmits the information indicating that function button 131 is depressed to PBX 100 via communication I/F 139 when detector 135 detects that button 131 is depressed. Controller 141 controls the entire extension telephone 114.

When function buttons 131 are assigned to call-in groups, the following operation is carried out (hereinafter function buttons 131 are referred to as group buttons): When a call comes in at a call-in group, all LEDs 133—attached to the group buttons of all the extension telephones belonging to the call-in group—flash red. At that time, the come-in call to the group button is caught by operating the extension telephone (depressing function keys 131 which are assigned to be group keys, depressing hook button 135 or the like). Then the group button's LED 133 lights green. The other LEDs 133 of the group buttons of other extension telephones are turned off.

When a user places a call using this group button, LED 133 lights green, and other LEDs 133 of other extension telephones' group buttons remain off-status. In other words, group button 131 does not prevent the other extension telephones of the same call-in group from functioning. Using group button 131, the user thus can place a call to another extension or an outside telephone just following a dial number, as in the same manner as the user dials using an extension button.

Figure 4:
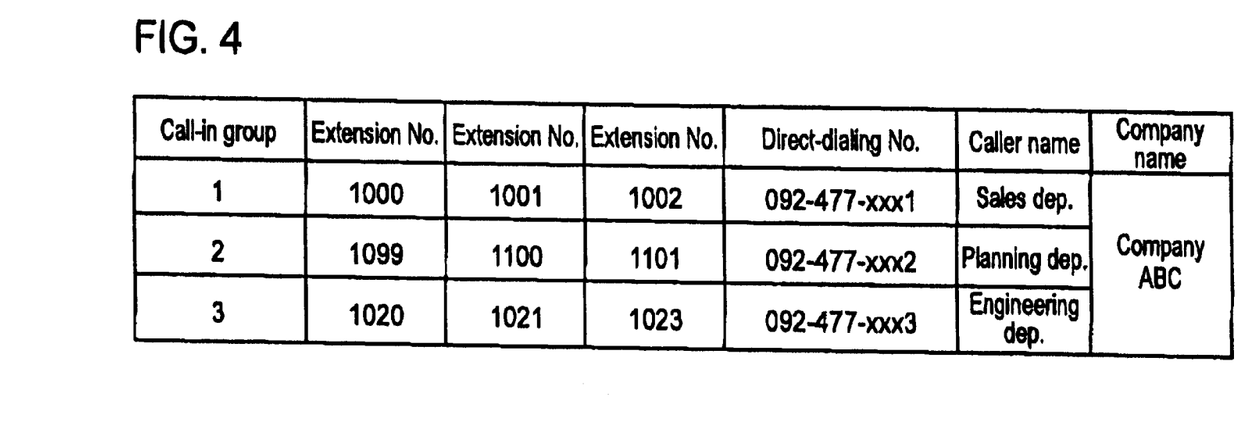
FIG. 4 shows content of a call-in group memory of the PBX in accordance with the exemplary embodiment of the present invention.

FIG. 4 shows content of a call-in group memory of the PBX in accordance with the exemplary embodiment of the present invention. This memory stores call-in groups 1–3 corresponding to I/F numbers. Further, the information, such as extension numbers of the group, a direct-dialing number of the group, the group name, the company name and the like, is associated with the group and saved in respective call-in groups. The direct-dialing number of the group is saved for informing a caller of the number as a pilot number, and a group name is saved for informing the caller to whom the call is placed. This information can be sent to the caller regardless of the call from an extension or an outside line.

A telephone number of a call-in group is noticed to other extension telephones by a control event exclusively designed for the PBX. The number is noticed to outside lines via the I/F of ISDN trunks. For instance, a telephone number of a caller is noticed using the Calling Line Identification Presentation (CLIP) service, and a telephone number of a called party is noticed using the Connected Line Identification Presentation (COLP) service.

Figure 5:
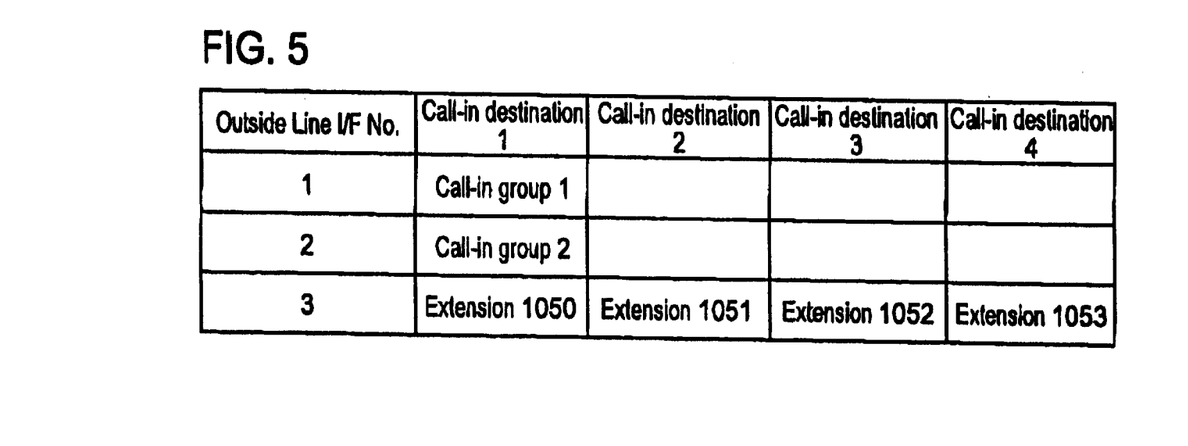
FIG. 5 shows content of a call destination memory in accordance with the exemplary embodiment of the present invention.

FIG. 5 shows content of call destination memory 107 in accordance with the exemplary embodiment of the present invention. Memory 107 stores which extension or call-group receives a call-in signal delivered from office exchange 118 to respective I/Fs. For instance, when a call-in signal arrives at I/F 1, this signal is processed such that the signal arrives at call-in group 1. Call-in group 1 is then determined extensions 1000, 1001 and 1002 by referring to call-in group memory 108. The content of call destination memory 107 can be arbitrarily set, and a plurality of I/Fs can be set in one call-in group.

Also, in FIG. 5, the registration of the relationship among the outline I/F and the call destinations is explained. However, in the same manner as explained in FIG. 5, the registration of the relationship among the DDI number—instead of the outline I/F—and the call destinations may be explained.

If the registration as to the DDI number is adapted, the DDI numbers are able to be set to be received in the call-in group as call destinations.

Further, it may be utilized that the call-destination is determined by both the outline I/F and the call-in number.

Figure 6:
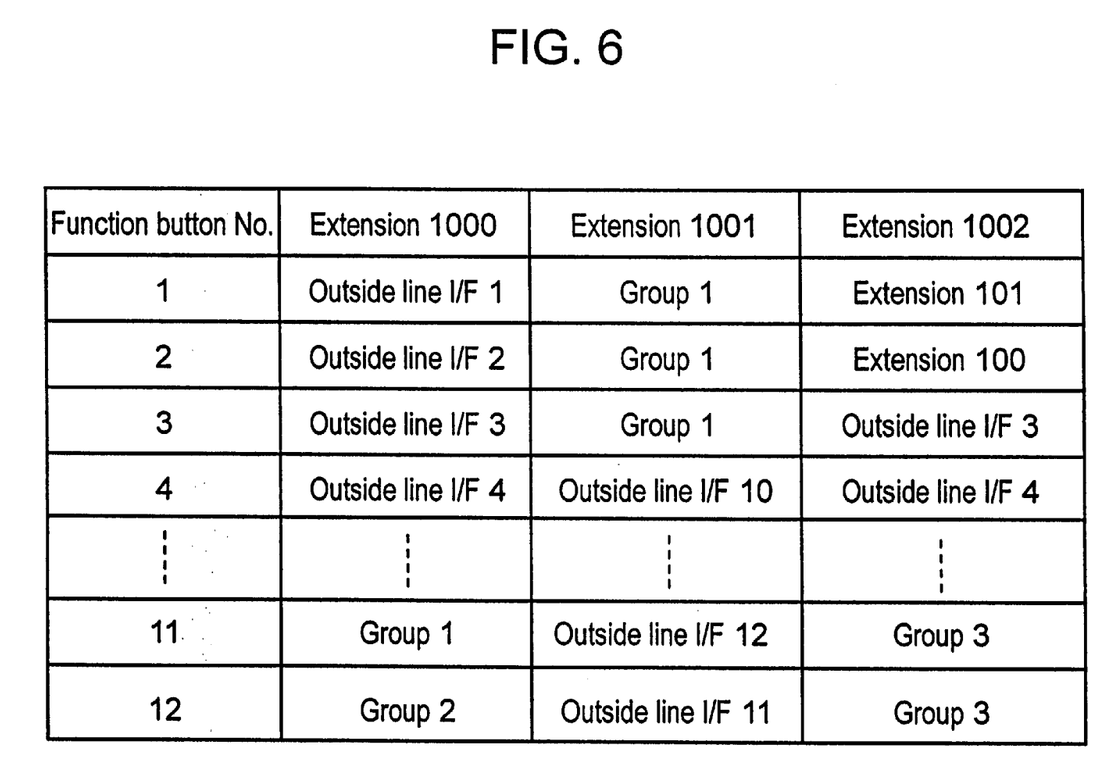
FIG. 6 shows content of a function button memory disposed on an extension telephone.

FIG. 6 shows content of function button memory 204 disposed on PBX 100. Memory 204 stores which functions are assigned to which function buttons (12 buttons/telephone) in extension telephones 114–116 (extensions 1000–1002). For instance, an outside-line button function of outside-line I/F 2 is assigned to function button 2 of extension telephone 114 (extension 1000). When outside-line I/F 2 receives a call, LED 133 corresponding to the outside-line button flashes red. Depressing this outside-line button, a user can place a call from outside-line I/F 2 to destination telephone 119 via office exchange 118, by dialing the telephone number of outside line telephone 119.

The group button of group 1 is assigned to function button 12 of extension telephone 114 (extension 1000). When outside-line I/F 2 receives a call, LED 133 of the group button flashes red. Depressing this group button, a user dials the telephone number of destination telephone 119, then this call is delivered from the assigned outside-line I/F or a free outside-line I/F to telephone 119 via exchange 118.

For instance, assume that two function-buttons are assigned to an outside-line button of outside-line I/F and a group button of call-in group 2 respectively. Then a call comes in outside-line I/F 2, which flashes red LEDs 133 attached to function buttons 2 and 12. At this time, a priority can be given to the group button rather than the outside-line button and thereby flashing red LED 133 corresponding to the group button alone.

Figure 7:
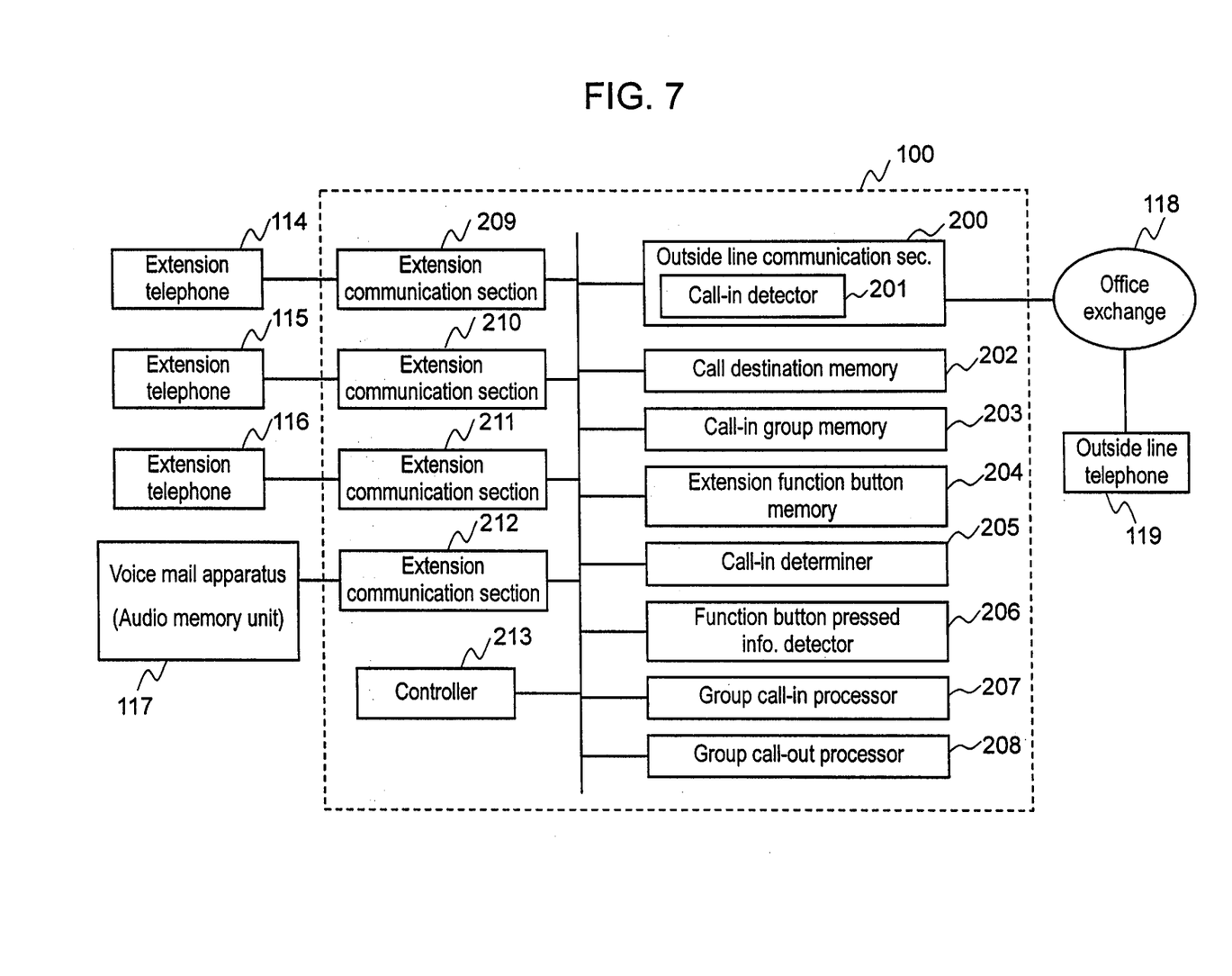
FIG. 7 is a block diagram showing functions of the PBX in accordance with the exemplary embodiment of the present invention.

FIG. 7 is a block diagram showing functions of the PBX having the structure discussed above. Outside-line communication section 200 has the function of outside-line I/F 105, and functions as an I/F for closing/opening a trunk as well as carrying out a call. Section 200 includes call-in detector 201 which detects a call-in from office exchange 118. Since there are a plurality of outside-line I/Fs 105, this outside-line communication section 200 also has the function of a plurality of I/Fs 105. Further, there can be a plurality of call-in detectors 201 corresponding to the plurality of I/Fs 105.

Call-destination memory 202 corresponds to call destination memory 107 in FIG. 1, and stores the information about the destinations such as extensions and extension group numbers of the destinations. Call-in group memory 203 divides at least one extension into groups, and stores "group number, group telephone number and group name" correlated with each other.

Extension function-button memory 204 stores the functions assigned to plural function-buttons 131 which each of extension telephones includes. When detector 201 detects a call-in signal, call-in determiner 205 detects to which I/F 105 call-in detector 201 corresponds. Determiner 205 retrieves a call-in extension number and a call-in group corresponding to an outside I/F which receives the call-in signal from call-in group memory 203.

Group call-in processor 207 mainly carries out the following process when the call-destination information retrieved from memory 203 includes a call destination group.

(1) Inform status-indicator 133 of the call-in arrival. (LED 133 flashes red.) This status-indicator 133 corresponds to a call-in group button of the extension telephone belonging to the call-in group that is stored in memory 204.

(2) Transmit the group information (at least one of the telephone number of a caller, the name of the caller, and the company name) stored in memory 108 to the outside-line I/F which has been detected by detector 201.

Extension telephones 114–116 transmit the information about the depression of the function buttons from function-button-pressed-information transmitter 140.

When detector 206 determines based on the function-button depression information that the call-in group button is depressed, group call-out processor 208 mainly carries out the following process:

(1) Send the telephone number dialed at an extension telephone to the trunk through a given outside-line I/F or a free outside-line I/F.

(2) Send the group information stored in memory 203 to the outside-line I/F.

Further, extension communication sections 209–212 can be connected to a proprietary telephone, general telephone, voice-mail device and the like, and communicate with these devices. Communication sections 209–212 receive the information about operating respective buttons from the extension telephones, transmit display information to be displayed on the display section of the extension telephones, and sends/receives voice data. Extension communication sections 209–212 correspond to extension I/Fs 101–104 shown in FIG. 1. Controller 213 controls the entire PBX 100.

An operation of the PBX system of the present invention is demonstrated with reference to the function block diagram shown in FIG. 7 and the flowcharts shown in FIG. 8–FIG. 11.

Figure 8:
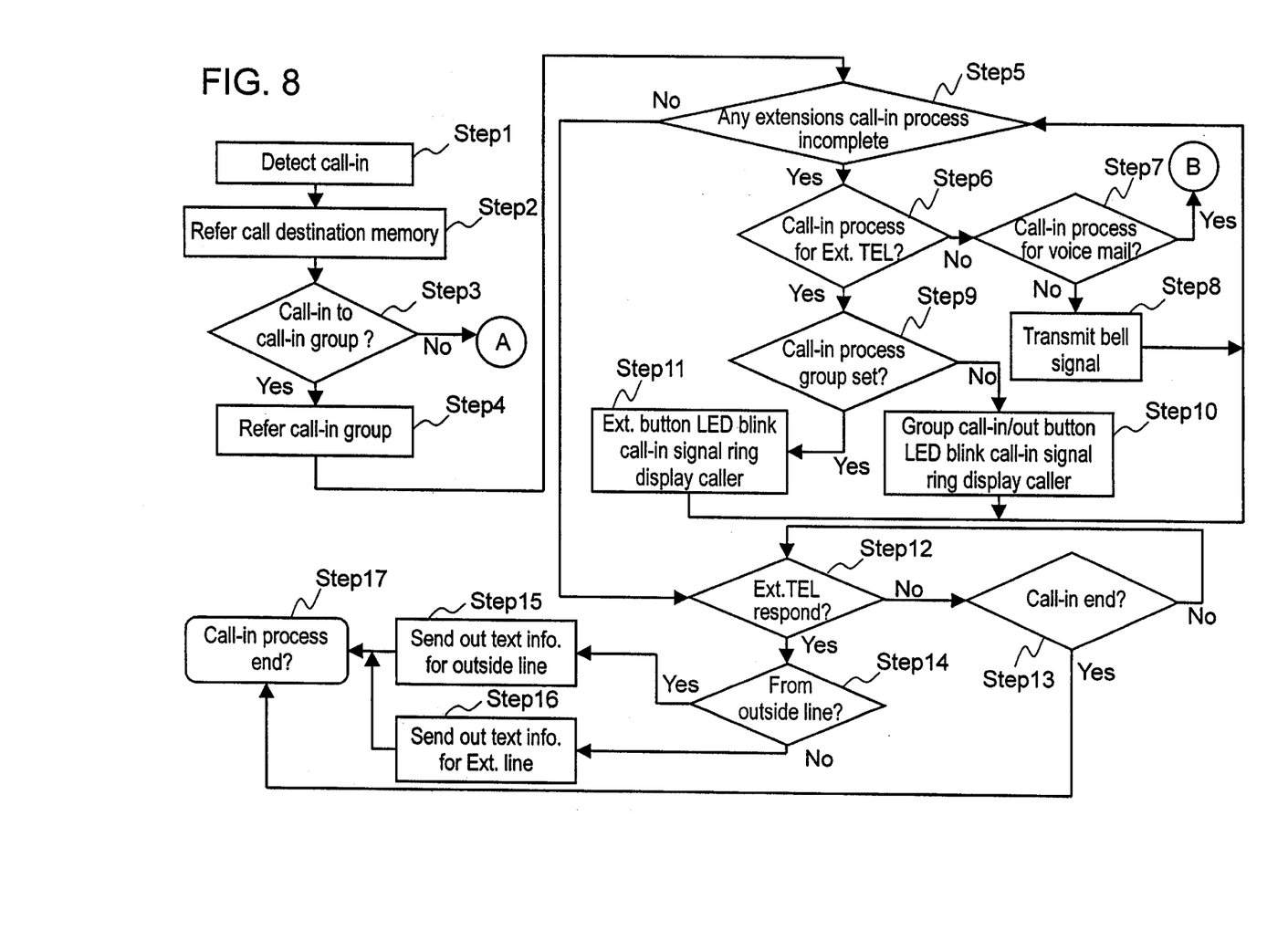
FIG. 8 is a flowchart illustrating a call-in operation at a group in accordance with the exemplary embodiment of the present invention.

Step 1: When one of outside-line I/Fs (refer to FIG. 1) that are connected to office exchange 118 receives a call-in signal sent from exchange 118, call-in detector 201 detects the signal.

Step 2: Call-in determiner 205 detects which outside-line I/F receives the call-in signal based on information from detector 201, and retrieves the call destination corresponding to the outside-line I/F from call-in memory 202.

Step 3: Determiner 205 determines based on call-in group memory 204 whether or not the call destination retrieved includes the call-in group.

Step 4: If the call destination includes the call-in group, then group call-in processor 207 retrieves each of the extension numbers of the destination, direct-dialing numbers of the destination, extension-holders' names and the company name out of call-in group memory 202. Herein, processor 207 may retrieve only the telephone number. Other information may be used only when a call is sent out.

In step 3, controller 213 moves to step A when determiner 205 determines that the call-in group is not found in the destination. For instance, when an outside-line I/F of I/F 1 receives a call-in signal, determiner 205 retrieves call-in group 1—a call destination of I/F 1—from call-in memory 202. Since call-in groups are set in the call destination, group call-in processor 207 refers to call-in group 1, which has been set in the call destination of I/F 1, in call-in group memory 204. Then processor 205 retrieves extensions 1000, 1001, 1002, group's direct-dialing telephone number 092-477-xxx1 and the group name "Marketing Dept." from memory 204.

Group call-in processor 207 then carries out a call-in process for the extensions in the call-in group.

Step 5: Processor 207 detects an extension in which a call-in process is not yet carried out.

Step 12: When the call-in process is carried out for each of the extensions, the extension telephone of the call destination replies to the call-in signal, or Step 17: Complete the call-in process when call-in detector 201 detects the completion of the call-in (Step 13).

Step 12: When the extension telephone replies to the call-in signal before detector 201 detects the completion of the call-in, Step 14: Controller 213 determines whether the call-in has arrived at the outside-line I/F or the call-in has been sent out from an extension I/F.

Step 15: If the call-in has arrived at the outside-line I/F, controller 213 sends the text data for the outside-lines to the outside-line I/F where the call-in has arrived. The text data includes the direct-dialing number, extension-holder's name, or the company name, which corresponds to the call-in group shown in FIG. 5.

Step 16: If the call-in has been sent out from the extension I/F, controller 213 sends the text data for the extensions to the extension I/F which has placed the call. The text data includes the extension-holder's name corresponding to the call-in group shown in FIG. 5.

If the call-in process is not completed at an extension, group call-in processor 205 carries out the call-in process at the extension.

Step 6: To be more specific, processor 207 confirms whether or not the telephone to be processed is a proprietary telephone.

Step 9: If the telephone is the proprietary one, processor 207 refers to memory 204 and confirms whether or not the group button corresponding to the destination call-in group number has been set to the proprietary telephone.

When the button has been set, processor 207 flashes LED 133 attached to the group button of the proprietary telephone.

Step 10: When the PBX sends a call-in signal to a proprietary extension telephone, and when call-in determiner 205 has detected caller's information such as caller's number and name, group call-out processor 208 sends a given signal to the related extensions in order to display the caller's information.

Step 11: When controller 213 determines that no group button is set, group call-in processor 207 (i) flashes the LED corresponding to the extension button or the outside-line button if it is set, and (ii) in the case of sending the call-in signal, when call-in determiner 205 has detected caller's information, group call-in processor 207 sends the given signal from controller 209 to the related extensions in order to display the caller's information.

The operation is further demonstrated with reference to FIG. 3–FIG. 6. Assume that a call-in signal arrives at outside-line I/F 1, then the call-in is noticed to three extensions, namely, 1000, 1001 and 1002 (refer to FIG. 4) belonging to call-in group 1 at which the call-in signal is supposed to arrive.

Suppose that all the three extensions discussed above are the telephones dedicated to the PBX 100 and each of their function buttons is assigned to call-in group 1. Then group call-in processor 207 flashes LEDs 133 red attached to the group buttons of the three extensions. If caller's information is available, processor 207 sends a control signal via the extension I/F to respective extensions so that the information can be supplied as well as a call-in tone can be supplied from respective speakers 138.

A caller's information receiver is provided so that the caller's information can be received at outside-line I/F 105.

When a call-in signal arrives at PBX 100, in one of proprietary extension telephones 1000–1002, suppose that either function button 131 which is set as a group button or hook button 136 is depressed. At this time, function button pressed information transmitter 140 sends the pressed information to PBX 100 via communication I/F 139.

Group call-in processor 207 receives the pressed information, and flashes the LED green corresponding to the group button depressed, and turns off the other LEDs of other buttons which are not pressed-down.

While the proprietary telephone, of which function button has been pressed, receives the call-in, another call-in arrives at call-in group 1, LEDs attached to the group button of the telephones other than this proprietary telephone flash red.

Suppose that the proprietary telephone, which receives the call-in, has a plurality of function buttons in which call-in group 1 is set. At this time, LEDs—corresponding to call-in group 1 and attached to group buttons other than the group buttons engaged with receiving the calls-in—flash red.

Therefore, when necessary, one proprietary telephone can be equipped with a plurality of group buttons corresponding to one group number. In this case, an operator of e.g., the marketing department can receive and handle calls-in for respective call-in groups with ease.

When a call-in to a call-in group is received by not a group button but an outside-line button or an extension button, the telephone number or the name of outside-line I/F where the call-in has arrived is sent by an office exchange as destination information in responding to the call-in. A call-in to be received by an outside-line button or an extension button depends on the setting; however, the telephone number or the name of a call-in group can be sent by the office exchange as destination information.

In this embodiment, when group call-in processor 207 determines that a call-in has come from an outside-line I/F, processor 207 sends the following text data retrieved from call-in group memory 203 to telephone 119 via an outside-line I/F:

(1) direct-dialing number of the group: 092-477-xxx1
(2) group name: Marketing Department
(3) organization name: Company ABC If the caller's telephone is equipped with a display section such as an LCD, this operation allows the caller's telephone to display the above information.

On the other hand, after PBX 100 determines that a call-in comes from an extension I/F, PBX 100 sends only the text data of "Marketing Department" retrieved from memory 203 to the caller's extension telephone.

Thus the caller, who places a call to an extension telephone connected to this PBX, can recognize whether or not the call arrives at the right destination.

Figure 9:
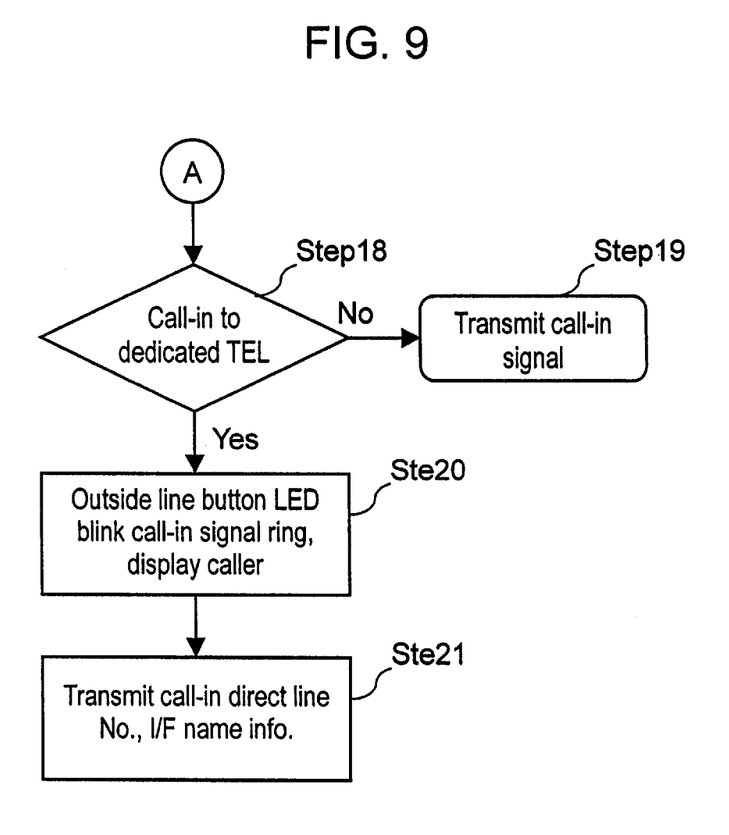
FIG. 9 is another flowchart illustrating a call-in operation at a group in accordance with the exemplary embodiment of the present invention.

Step 18: When a call-in arrives at a telephone where a call-in group is not set, controller 213 detects whether or not the called telephone is a proprietary telephone.

Step 19: When controller 213 determines with reference to FIG. 9 that the called telephone is not a proprietary one, controller 213 sends a call-in signal (bell-ring) to the called extension telephone.

Step 20: When controller 213 determines that the called telephone is a proprietary telephone, controller 213 flashes the LED attached to an outside-line button corresponding to the outside-line I/F where the call-in has arrived. Further, controller 213 sends a call-in signal and a control signal so that a detected caller's telephone number can be displayed on the called telephone.

When an outside-line button corresponding to the outside-line I/F where the call-in has arrived is not set, controller 213 carries out the same operation to an extension button.

Step 21: Further, controller 213 makes PBX 100 send text data such as an I/F number and the like to the caller.

Figure 10:
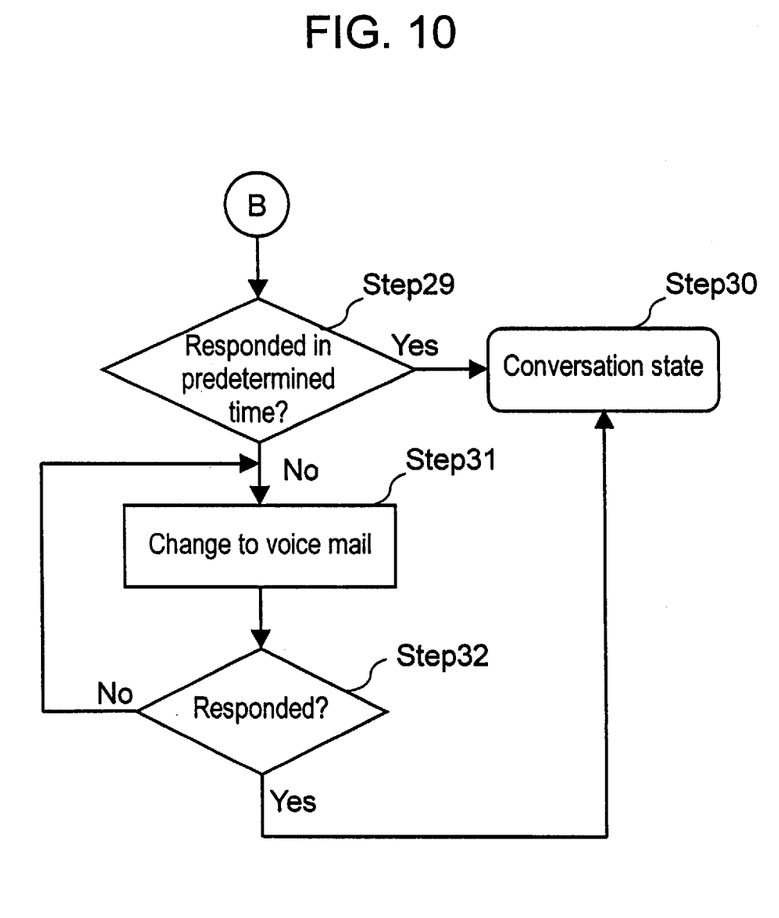
FIG. 10 is still another flowchart illustrating a call-in operation at a group in accordance with the exemplary embodiment of the present invention.

In a case that the call-in process in step 7 shown in FIG. 8 is carried out to a voice mail, this operation is demonstrated below with reference to FIG. 10.

Step 31: If a voice mail exists at a call destination of a call-in group, and when controller 213 determines that a telephone in a call-in group does not respond to the call within a given time, the call-in is switched to a voice mail, and Step 32: A direct dialing number of a destination and a call-in number of the destination are sent to the voice mail, and the voice mail is expected to reply the call-in.

Step 30: If a response comes from the voice mail, the communication starts.

The voice mail receives the call-in group number, so that not voice main guidance but voice guidance of the mail box of the call-in group can be provided immediately after the response. Therefore, if a recorded message of the voice mail exists in a lower section of the hierarchical structure of the voice mail guidance, a user's operation can be omitted, thereby providing the users with convenience.

In this embodiment, a plurality of extensions set as destinations of a given outside-line I/F are divided into some groups, and the group telephone numbers and the group names are correlated with each other for registering. Further, an exclusive button for each group (hereinafter referred to as a group button) is set to each of proprietary telephones in addition to an extension button corresponding to each of extensions. This arrangement allows a user of each of the extensions to identify instantly a call-in as a call-to-person or a call-to-group (e.g. a call-to-group 1 means a call to the Marketing Dept.) by looking at which button flashes.

When an extension button flashes, it means the call is a call-to-person, and when a group button flashes, the call is a call-to-group. A caller through an outside-line can receive a connected-line-identification number of the call-in group.

When one call-in group is assigned to a plurality of outside-line I/Fs, a call-in memory is set such that the same group numbers assigned to the plural outside-line I/Fs are stored in the memory. As previously described, a group button is not associated with other group buttons of other extensions within the one call-in group except the case when the button receives a group call-in.

Therefore, while someone in a group replies to a group call-in, other extensions in the group are ready to receive a next group call-in. This advantage can save many of the same group buttons. When a plurality of calls-in arrive at the PBX, each of the calls-in comes to respective extensions by using a universal call distribution (UCD) function. Therefore, a call-in is connected to a destination call-in group immediately.

In a case that a voice mail is connected to the PBX, and a destination of a group is set at the voice mail, the telephone number and the name of the group are notified from the PBX. Therefore, a mail box or a guidance corresponding to the group can be provided, which increases convenience for the users.

To be more specific, the PBX sets a destination of outside-line I/F 1 and I/F 2 at call-in group 1 (e.g., marketing/477-1424.) When a call-in comes, the PBX informs the voice mail of the access number "1424" corresponding to the group. The voice mail can set a voice-mail guidance responsive to the access number, or a guidance for an attendant.

The voice mail guidance is, for instance, "This is the marketing department of company ABC. We are sorry we cannot respond to you right now. Please leave your message. We will call you back later." The attendant guidance is, for instance, "This is the marketing department of company ABC. If you want to call DD, please depress button 1, if you want to call EE, please depress button 2 . . . ."

Further, at a call center, if a number of calls-in waiting replies exceeds a given numbers because extensions in a call-in group are busy, the calls-in waiting replies are transferred to the voice mail. Then these callers are informed of the information about the group and the information about the waiting. The voice mail further provides these callers with a waiting guidance, for instance, "This is the marketing department of company ABC, all the telephones are busy right now. Please wait for a while."

When the number of group calls-in waiting replies lowers to less than the give number, the calls-in are separated from the voice mail and are put in call-in mode again. This operation allows the callers to feel easy even when the line is busy and the calls-in to be dealt with in an efficient manner.

Figure 11:
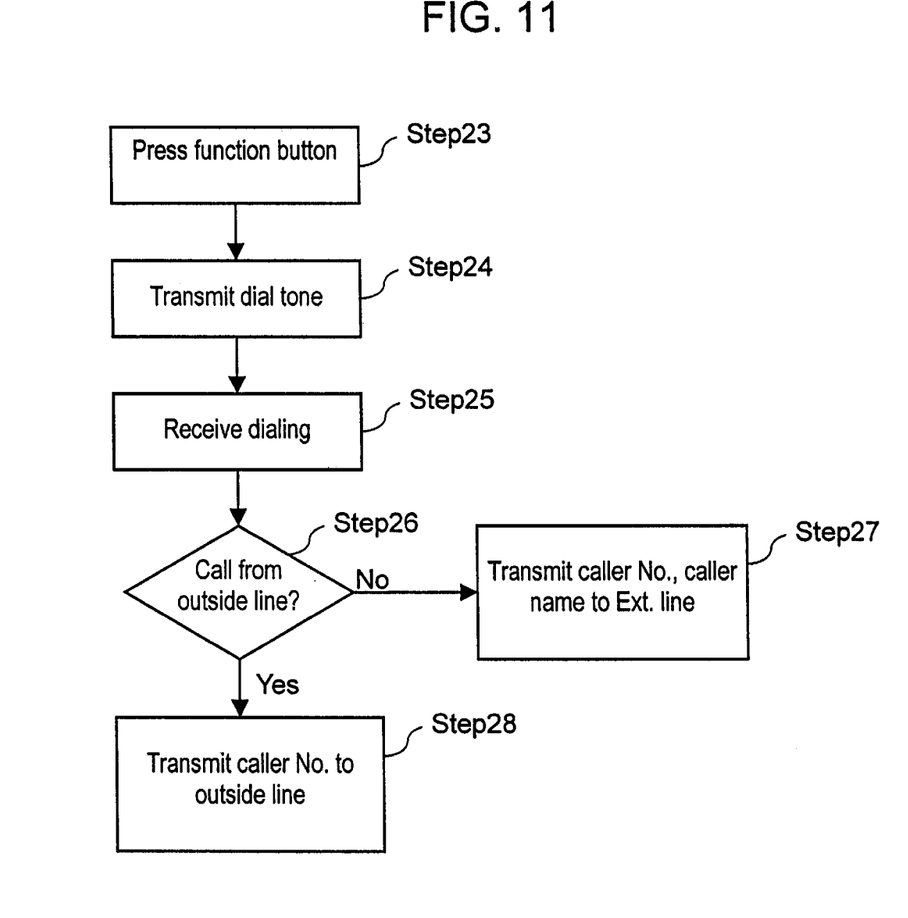
FIG. 11 is a flowchart illustrating a call-out operation in accordance with the exemplary embodiment of the present invention.

Next, a call-out operation using a group button is demonstrated with reference to the flowchart shown in FIG. 11. First, at a proprietary telephone, one function button 131 assigned to a group button is depressed, then function button pressed detector 134 detects the depression of function button 131. Function button pressed information transmitter 140 transmits the information of depressing the function button to PBX 100 via I/F 139 (Step 23). In PBX 100, detector 206 receives the information □ about depressing the function button □ sent from an extension telephone.

Determining that the depressed function button is assigned to the function of a group call-in button, (1) controller 213 of the PBX sends a dial tone, of which meaning is to receive an input of a telephone number, to a proprietary telephone via outside-line communication section 200. (2) PBX 213 flashes the LED green attached to the depressed function button (S24.)

This operation does not change displays of other LEDs 133 attached to other group buttons disposed on the other proprietary telephones within the one call-in group.

Then in this proprietary telephone at this status, a telephone number of a destination is input through dial button 134, and the number is sent to the PBX via communication I/F 139. Outside-line communication section 200 of the PBX receives the number (S25.) The PBX analyzes the number and confirms whether or not the destination is outside (S26.)

When the destination is outside, group call-out processor 208 sends the number dialed at an extension telephone to a trunk from a given outside-line I/F (a free I/F among a plurality of I/Fs.) At this time, group information (a direct dialing No., a name of a user and a company name if available) saved in a call-in group memory is sent to the outside-line I/F as caller's information (S28.)

If the destination is an extension including a voice mail, group information such as a group No. and a group name saved in the call-in group memory is sent to the destination (S27.)

As discussed above, the use of a group call-out button allows a call-out from a group to be transmitted to a destination together with group information such as the telephone number and the name of the group, independent of a call-from-person. Therefore, respective call-in and call-out buttons assigned to a plurality of groups are employed on proprietary telephones, so that telephones of plural companies can be handled with ease like a call-center service agent.

For instance, in a case that plural operators are placed and plural I/Fs are employed, the trunk of primary rate I/F (PRI)

is used and a direct dial-in (DDI) method is adopted, so that a call-in arrives at a free channel regardless of physical location of the trunk. In addition to this, a DDI number is associated with a call-in group at the arrival. This operation allows the call-center service agent to use group call-in/call-out buttons independently for its respective clients. The agent thus can inform caller's information to respective clients, and use a number of trunk channels efficiently.

When a voice mail is connected to the PBX, a use of the group button allows a call-in to arrive at the voice mail in the following manner: A telephone No. and a name of a destination group are sent from the PBX, the PBX thus can provide immediately a mail box corresponding to the group. This is an advantage for the users.

To be more specific, in the PBX, when a call is placed using a group button (e.g., group 1, Marketing Dept. 477-1424), the information, such as a group name "Marketing Dept.", the telephone No. "477-1424" and this call is placed from an extension, is sent to the voice mail. The voice mail sets "Marketing Dept." as a group name, and "477-1424" as a telephone No., and further, sets a mail box to an extension call-out. This set content is, for instance, "This is a mailbox of the marketing department. Two messages have arrived."

Many modifications and variations of the present invention are possible in the light of the above techniques. It is therefore to be understood that within the scope of the invention, the invention may be practiced otherwise than as specifically described.

What is claimed is:

1. A private branch exchange (PBX) system comprising:
   (a) an extension telephone; and
   (b) a PBX including:
      (b-1) a group number memory for storing an extension number of said extension telephone and a group number corresponding to the extension number;
      (b-2) a group number detector for detecting the group number corresponding to a call-in signal;
      (b-3) a request-signal generator for sending an arrival-request signal to an extension telephone having an extension number corresponding to the group number detected,
   (c) a memory for storing text data corresponding to the group member; and
   (d) a transmitter for transmitting information saved in said group number memory to a telephone, which has sent the call signal, when said group number detector detects the group number,
      wherein when said extension telephone receives the request signal, said extension telephone indicates the receipt of the request signal.

2. The PBX system of claim 1, wherein the text data includes at least one of a telephone number and a group name.

3. A private branch exchange (PBX) comprising:
   (a) a group number memory for storing an extension number and a group number of a group, to which the extension number belongs, associated with the extension number;
   (b) a group number detector for detecting the group number corresponding to a call-in signal;
   (c) a first memory for storing text data regarding the extension group; and
   (d) a controller for controlling said PBX, so that the text data is sent to a caller when the call-in signal to the extension group is received.

4. The PBX of claim 3 further comprising:

(e) a determiner for determining whether or not the call-in signal comes through an outside-line,
      wherein said first memory stores text data for an outside-line, and transmits the text data for the outside-line to the outside-line when said determiner determines that the call-in signal comes through the outside-line.

5. The PBX of claim 3 or 4, wherein the text data saved in said first memory includes at least one of a telephone number and a group name.

6. The PBX of claim 3 further comprising:
   (f) a second memory for storing voice information,
      wherein said PBX sends the voice information to the caller when no answer comes from the extension telephone within a given time after the extension telephone receives the call-in signal.

7. The PBX system of claim 1, wherein when a caller is on an outside-line telephone, said PBX sends the text data to the outside-line telephone.

8. The PBX system of claim 7, wherein text data, for an outside-line, stored in said memory is sent to the outside-line telephone as the text data as defined in claim 7.

9. The PBX system of claim 7 or 8, wherein the text data includes at least one of a telephone number and a group name.

10. The PBX system of claim 1, further comprising:
    a second memory for storing voice information;
    wherein said PBX sends a voice signal from said second memory to a caller when no answer comes from the extension telephone within a given time after said PBX receives the call-in signal.

11. A private branch exchange (PBX) system comprising:
    (a) a PBX, including an outside-line interface (I/F) and a plurality of extension I/Fs, for setting a call-in group which includes a plurality of extensions; and
    (b) an extension telephone coupled to the plurality of extension I/Fs and including:
       (b-1) a plurality of function buttons where functions can be assigned;
       (b-2) indicators corresponding to respective said plurality of function buttons, wherein the call-in group is set to one of said function buttons,
          when a call-in arrives at the call-in group, the extension telephone belonging to the call-in group indicates the call-in arrival at one of said indicators of one of said function buttons, the one button (group button) being associated with the call-in group,
          at least one of a telephone number and a name of the call-in group is sent to a caller,
          when a call is placed to one of said extension and an outside-line by depressing the group button, at least one of the telephone number and the name of the call-in group is sent to the caller.

12. The PBX system of claim 11, wherein said PBX further includes
    (a-1) a call-in group memory for storing extensions assigned to respective said extension I/Fs, the extensions being divided into groups for storage; and
    (a-2) a call destination memory for storing a destination corresponding to the call-in to each of said outside-line I/Fs,
       wherein when the call-in arrives at the call-in group, said PBX processes the call-in addressed to an extension stored in said call-in group memory.

13. The PBX system of claim 11, wherein said call-in group memory stores extensions, a direct-dialing number and a name of a group for each of the call-in groups with those data correlated with each other.

14. The PBX system of claim 11, wherein when a call-in arrives at the call-in group, (i) the indicator corresponding to the group button turns on in a first color, and (ii) when an extension telephone belonging to the call-in group catches the call-in, the indicator of the group button turns on in a second color, and other indicators corresponding to the group buttons of the extension telephones other than the extension telephone catching the call-in are turned off.

15. The PBX system of claim 11, wherein when a call is placed from said extension telephone, said indicator of said extension telephone is turned on by operating the group button, and extension telephones belonging to the call-in group and other than said extension telephone turn off indicators corresponding to group buttons of these other extension telephones, and these other extension telephones can be used as an extension telephone.

16. A method of communication using a private branch exchange (PBX) system which comprises (i) a PBX in which a plurality of call-in groups having a plurality of extension telephones can be set, (ii) a plurality of function buttons in which functions can be registered, and (iii) an extension telephone having indicators corresponding to said plurality of function buttons, said method comprising the steps of:
   (a) in the extension telephone, sending an instruction of placing a call from a group in response to a detection of depressing a function button (group button) associated with the call-in group;
   (b) in the PBX, receiving the instruction of placing the call from the group;
   (c) in the PBX, detecting a destination telephone number which is input from the extension telephone;
   (d) investigating whether or not the destination belongs to an extension line or an outside-line; and
   (e) sending information including a direct-dialing number of the call-in group as a caller's information to the destination on the outside-line when the destination belongs to the outside-line, and sending information including a group name to the destination on the extension line when the destination belongs to the extension line.

17. The method of communication of claim 16, wherein when the group buttons for one call-in group are set to one of said plurality of extension telephones, the group buttons work in an interrelated manner only when a call-in arrives at the one call-in group, and when one of the group buttons is depressed at the call-in arrival, information including the telephone number and the name of the group is sent to the caller.

18. The PBX system of claim 12, wherein
said extension telephone includes indicating means for informing a user of a usage status of the function buttons.

19. The PBX system of claim 18, wherein
when the call-in arrives at the call-in group, each of extension numbers assigned to group numbers of the call-in group, a direct-dialing number and a name of the call-in group are retrieved from said call destination memory, and a call-in arrival is indicated on each of the extensions, then at least one of the direct-dialing number and the name of the call-in group is sent to a caller.

20. The PBX system of claim 11, wherein said extension telephone further includes indicating means corresponding to said function buttons, and
said PBX further includes numbers of said plurality of function buttons of said extension telephone and an extension-function-button memory for storing the numbers associated with the functions of said function buttons.

21. The PBX system of claim 20, wherein a group call-in processor activates said indicating means to indicate the call-in arrival only when the call-in arrives at the call-in group, and when said extension telephone belonging to the call-in group catches the call-in, the processor controls said indicating means to finish the indication of the call-in arrival.

22. The PBX system of claim 20 or 21, wherein said extension function button memory can be set to respective said plurality of extension I/Fs.

* * * * *